United States Patent
Heermann et al.

(10) Patent No.: US 11,702,263 B2
(45) Date of Patent: Jul. 18, 2023

(54) PACKAGING CONTAINER AND FILM PRODUCTION

(71) Applicant: Bischof + Klein SE & Co. KG, Lengerich (DE)

(72) Inventors: Frank Heermann, Lotte (DE); Albert Prigge, Ibbenbüren (DE)

(73) Assignee: Bischof + Klein SE & Co. KG, Lengerich (DE)

( * ) Notice: Subject to any disclaimer, the term of this patent is extended or adjusted under 35 U.S.C. 154(b) by 0 days.

(21) Appl. No.: 16/633,188

(22) PCT Filed: Jun. 18, 2018

(86) PCT No.: PCT/EP2018/066051
§ 371 (c)(1),
(2) Date: Jan. 23, 2020

(87) PCT Pub. No.: WO2019/020275
PCT Pub. Date: Jan. 31, 2019

(65) Prior Publication Data
US 2021/0147132 A1    May 20, 2021

(30) Foreign Application Priority Data
Jul. 26, 2017    (DE) ...................... 20 2017 104 459.9

(51) Int. Cl.
*B29C 59/04*    (2006.01)
*B32B 27/00*    (2006.01)
(Continued)

(52) U.S. Cl.
CPC ............ *B65D 75/30* (2013.01); *B32B 15/085* (2013.01); *B32B 15/20* (2013.01); *B32B 27/32* (2013.01);
(Continued)

(58) Field of Classification Search
CPC ................ B65D 75/30; B32B 2439/40; B32B 2307/538; B32B 27/32; B32B 15/20; B32B 15/085
See application file for complete search history.

(56) References Cited

U.S. PATENT DOCUMENTS

| | | |
|---|---|---|
| 6,444,080 B1 | 9/2002 | Mandzu et al. |
| 2013/0217556 A1* | 8/2013 | Mori .................... B29D 22/003 493/186 |

(Continued)

FOREIGN PATENT DOCUMENTS

| | | |
|---|---|---|
| DE | 1 704 920 | 6/1971 |
| DE | 41 02 367 | 8/1992 |

(Continued)

*Primary Examiner* — Ellen S Hock
(74) *Attorney, Agent, or Firm* — Gudrun E. Huckett

(57) ABSTRACT

The invention relates to a packaging container (1, 2) for loose or free-flowing filling material, said packaging container consisting of plastic monofilm or composite film with at least one layer of plastic and forming, in a filled and closed form, a wrapping of the filling material with two mutually opposing main walls (3, 4) which act as bearing faces in a stack with other filled packaging containers and consist of thermoplastic, at least on the outer surfaces (15) thereof. The packaging container according to the invention is designed to be stackable in a non-slip manner but also easily removable from the stack and to this end, for practical production and processing, is designed such that the two surfaces (15) are embossed for a surface roughness having a roughness depth of 20-40 μm.

9 Claims, 1 Drawing Sheet

(51) Int. Cl.
  *B65D 75/30* (2006.01)
  *B32B 15/085* (2006.01)
  *B32B 15/20* (2006.01)
  *B32B 27/32* (2006.01)

(52) U.S. Cl.
  CPC ..... *B32B 2307/538* (2013.01); *B32B 2439/40* (2013.01)

(56) References Cited

U.S. PATENT DOCUMENTS

| | | |
|---|---|---|
| 2014/0360573 A1 | 12/2014 | Nishioka et al. |
| 2018/0016071 A1 | 1/2018 | Grefenstein et al. |
| 2019/0091981 A1 | 3/2019 | Grefenstein et al. |
| 2019/0240959 A1* | 8/2019 | Savargaonkar ......... B32B 27/32 |

FOREIGN PATENT DOCUMENTS

| | | |
|---|---|---|
| DE | 10 2009 021 082 | 11/2010 |
| EP | 0 628 407 | 12/1994 |
| EP | 0 863 087 | 9/1998 |
| FR | 1407231 | 7/1965 |
| JP | H0516962 | 1/1993 |
| JP | 2002127246 * | 5/2002 |
| JP | 2006199346 | 8/2006 |
| KR | 1019890001239 | 4/1989 |
| RU | 2286293 | 1/2006 |
| WO | 2012/152494 | 11/2012 |
| WO | WO2019235399 * | 12/2019 |

\* cited by examiner

PACKAGING CONTAINER AND FILM PRODUCTION

BACKGROUND OF THE INVENTION

Packaging containers for loose or free-flowing filling material of different kind are increasingly manufactured of films, in particular when the packaging is to fulfill higher standards, wherein for smaller packagings ("pouches") as well as for large size packagings ("bags") primarily (thermoplastic) plastic materials of the group of polyolefins and, in respect to them, in particular polyethylenes are employed which are inexpensive and beneficial in regard to processing with respect to material costs and the relatively low melting temperatures.

In the filled and stacked state, the surface of PE films or of PE layers as well as the surface of numerous conceivable other thermoplastic plastic materials is however so smooth that the products packaged therewith have the tendency to shift, to become displaced easily relative to each other, or to slide off each other in the stack. Moreover, large size packagings with smooth surface are difficult to grip and to handle.

As a remedy, there have already been attempts in practice to add to the packaging material inclusions of grainy materials, such as chalk or polymer particles of higher melting point, as dispersed particles in the surface which however imparts to the packaging an unflattering appearance with "pimples" and primarily are counterproductive in regard to printability with a print image according to modern high standards.

In practice, other attempts with a complete deformation of the packaging film to a knob pattern that interlocks with and hooks on a corresponding pattern of a packaging lying underneath or above have also been found to be problematic. Such interlocking leads to a stable position in the stack even if it is provided only across partial surfaces, but impairs then removal from the stack when a packaging no longer can be pulled off laterally but must be lifted off. In addition, a packaging surface is produced that can no longer be printed on or only to a limited extent. The deformation of the packaging film required for this is also to be discarded routinely when the film comprises inner barrier layers which might become damaged or weakened upon deformation.

Object of the invention is therefore to provide a film packaging which, on the one hand, can be stacked in the state filled with a loose or free-flowing filling material so as not to slide but to be also easily removable from the stack and which can be produced and processed in a practicable way.

SUMMARY OF THE INVENTION

According to the invention, this object is solved, starting with a packaging container of the aforementioned kind, in that the two surfaces comprise an embossment to a surface roughness with a roughness depth of 20-40 μm. Furthermore, the object is solved with a film for producing such packagings that is characterized by being embodied in at least one outer layer as a cast film with one-sided embossment to a surface roughness with a roughness depth of 20-40 μm.

The solution according to the invention creates by means of a surface embossment of the packaging film with roughness depths of 20 μm to 40 μm a film which is only finely modified in its surface and in principle can be processed like an unmodified film. The surface gives a matt impression due to the surface roughness whereby a quite pleasing and regularly welcomed impression of the packaging in comparison to packagings with conventional smooth surface can be achieved. Moreover, the surface with a surface shape embossed with minimal roughness depths can be printed on in a conventional manner, namely also with regard to demands regarding a high-quality print image.

In particular, compared to corresponding surfaces of other packaging containers, the surface is provided with a sufficient anti-sliding action with coefficients of friction for the sticking friction of approximately 0.8, or a value that lies slightly below down to approximately 0.6, which provides for a stable stacking which however still permits nonetheless an easier handling with sliding action toward the side for removal of such packaging containers from the stack. For handling in particular heavy large size packagings, a better grip is provided due to the rough embossment of the surface.

The manufacture of a packaging container of the kind according to the invention from a plastic monofilm or a composite film is possible, despite the modified surface, in a way and with machine-technological means as known to a person of skill in the art for conventional films with smooth surface. Embossment of the surfaces to a predefined surface roughness can be realized particularly advantageously when manufacturing the film as a cast film or when applying the outer layer as cast film onto a continuously moving film. The cast film or cast film layer is extruded through a wide slot die, is pulled off continuously by itself or with the solid underlying layer film and passes in the still soft state a cooling roller engaging from above whose surface comprises a surface structure that is complementary to the desired embossment. The surface of the film obtains thus an embossment through the cooling roller which is maintained at the surface upon cooling and solidification of the films.

An embossment roller, in particular a cooling roller with a corresponding surface for roughness depths of 20-40 μm, can be obtained already in a simple way, starting from a conventional smooth cooling roller, by electro-erosion or by chemical, in particular electrolytic, surface removal, whereby irregular direction-independent embossment structures result which are also desired for the surface of the embossed film. Other embossment structures, for example, groove, depression, or knob patterns with irregular orientations in dense neighboring arrangement, are in principle employable but more complex with regard to production while direction-dependent structures of the embossment may lead to direction-dependent coefficients of friction and, when processing a corresponding film to a packaging container, must be routinely taken into account in disadvantageous or cumbersome way. Irregular erosion surfaces on cooling and embossment rollers rather lead to a dense fine distribution of roughness depths in the film surface.

A polyolefin or polyolefin mixture is conceivable in particular as material for a packaging container of this kind and for the film for its production, in this context primarily a polyethylene of high or low density, also in cross-linked form and/or in a mono-directionally or bidirectionally stretched form particularly for increasing the strength.

For protection of the filling material, composite films may comprise layers of different polymer materials and also a barrier layer or several thereof. In addition to silicon oxide or aluminum oxide, for example, vapor-deposited onto a polyester layer, but also polyamide or polyvinyl alcohol layers, aluminum layers vapor-deposited in a minimal thickness of 6-15 μm, preferably 6-9 μm or even better only 6-7 μm, are primarily conceivable as a barrier layer; they still provide for a satisfactory barrier function but do not stand in the way of a type-pure disposal of a composite film which otherwise is comprised of polyethylene. Other than that, the thickness of the individual layers is to be selected in a conventional way with regard to the desired protective functions for the filling material, to the bond of the layers among each other and in particular also to itself and in sum to a satisfactory strength and stiffness of the packaging container. This applies also in relation to the configuration of a monofilm with regard to the load-bearing strength of the packaging container.

The packaging container may be provided with a print on the embossed surface already prior to cutting to size the film. However, it can also be printed on after cutting to size. In case of a composite film in which the surface to be embossed is applied in the form of a thin cast film layer, the supplied composite film can already be printed on beforehand and, together with the subsequent coating, can provide a scratch-resistant print image that shines sufficiently clear and brilliant through the embossed outer layer. The packaging container can be pre-manufactured already in a substantially ready-to-use form in the empty state so that for filling and subsequent closing only a one-sided fill opening or even only a fill valve is provided. The packaging container can be characterized in that, prior to filling, it is embodied as a hose comprising the outer surfaces. The packaging container can also comprise only a hose shape for an FFS method (form-fill-seal) which is closed and separated during the filling process by separating sealing seams.

A film for producing such a packaging container, which generally is continuously produced independently as a semi-finished product prior to tailoring a packaging container and us mostly dispensed as a rolled goods, is to be embodied according to the invention in at least one outer layer as a cast film with one-sided embossment to a surface roughness with a roughness depth of 20-40 µm. The embossment is usually applied across the entire width of the manufactured film. A partial embossment, for example, limited to strip-shaped film regions which in the tailored packaging container lie within the region of the support surfaces, is in principle possible but limiting in regard to further processing and generally not advantageous for the appearance of the packaging.

BRIEF DESCRIPTION OF THE DRAWINGS

An embodiment of the invention is illustrated in the drawing and will be explained in the following in more detail. In the drawing, it is shown in.

DESCRIPTION OF PREFERRED EMBODIMENTS

Figure 1:
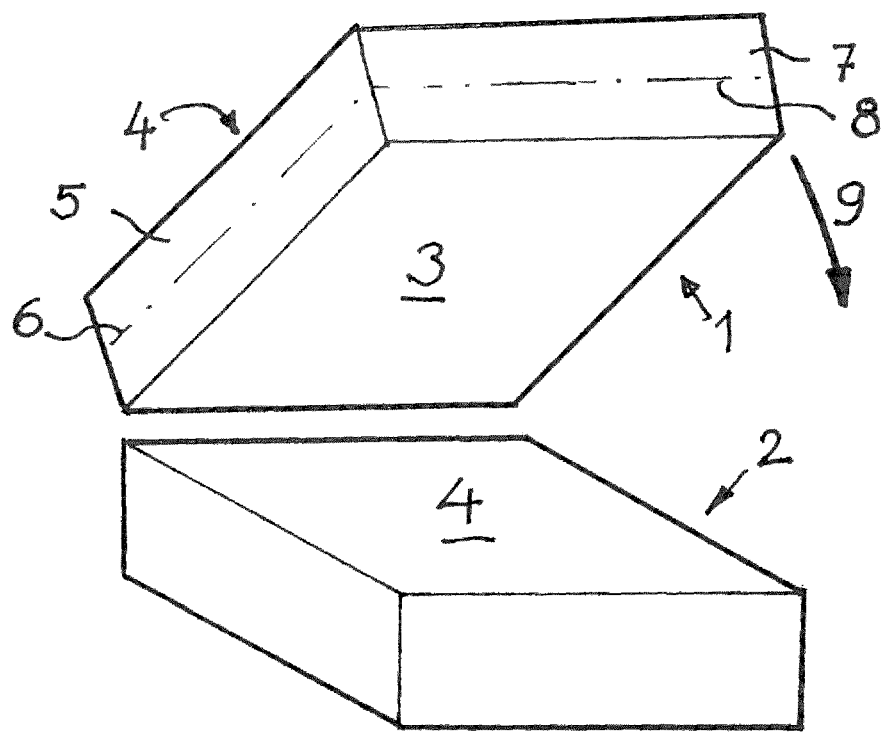
FIG. 1: perspective view of two packaging containers according to the invention.

In FIG. 1, two filled packaging containers 1 and 2 are illustrated in perspective view prior to stacking, when, for example, the packaging container 1 is to be placed onto the already lying packaging container 2 as congruently as possible. The packaging containers 1 and 2 are intentionally illustrated schematically as a box or cuboid, in particular because details of the dimensions or the packaging shape are not important in the present case. The packaging container 1 with two oppositely positioned main walls 3 and 4 (only the bottom main wall 3 is illustrated) is to be placed with the main wall 3 onto a top main wall 4 of the packaging container 2 for forming a stack and should not slide accidentally out of the stacked position. The main walls 3 and 4 together form routinely approximately flat horizontal support surfaces with contact pressure against each other under the weight of the packaging container 1.

The shaping of rim surfaces of the packaging containers 1, 2 is generally of no consequence for the present consideration. For example, sidewalls 5 can be embodied as gusset walls with an inward fold in the empty state along the center line 6 so that end face walls, such as an end face wall 7, may comprise transverse seams along a center line 8 for closure of the packaging container.

Packaging containers of this kind but also packaging containers with bottom gusset walls or with welded bottoms are typically designed as a cuboid shape in the filled state for a space-saving arrangement during transport and storage, but tend to assume a round shape, depending on the type of filling and degree of filling, when in a suspended or upright individual state. It is only important that such packaging containers in the filled state have approximately flat main surfaces 3, 4 as support surfaces when, for example, the packaging container 1 is stacked onto the packaging container 2, as indicated by an arrow 9.

In many fields, in particular those with higher standards in regard to protection of packaged goods and to a pleasing design, packaging containers of plastic material are employed. In addition to packaging containers of a simple monofilm, composite films with layers are often employed which provide in a targeted fashion locks for moisture, oxygen, aromas in order to prevent their entry into the filling material or their escape from the filling material. In this respect, polyester layers or metallic barrier layers as films or vapor-deposited layers are often conceivable. Preferably, such layers are connected to a stronger carrier material which primarily absorbs the mechanical loads of the film of a packaging container. Particularly, in consideration of the material costs, primarily polyolefins and among them especially polyethylenes are frequently used.

The packaging containers 1, 2 of the kind considered here can be smaller or medium packaging containers of handy dimensions and weights which can be stacked. The difficulties when stacking packaging containers however become greater with increasing fill weights which, also under handling considerations, may still amount up to 50 kg fill weight and beyond.

Conventionally, films for packaging containers can be produced particularly simply in the form of so-called blow films which are expanded from tubular dies from an extruded film hose of smaller diameter in the still soft state by means of a pressure-loaded inner atmosphere and subsequently stabilized by shaping baskets and subsequently rolled up. Due to their manufacture, such films have a smooth surface which is difficult to grip when handling and is slick when stacking filled packaging containers so that the positional stability of stacks is not sufficient for practical applications. Previous concepts for position securing of packaging containers with filling material in the stack have however been hardly accepted in practice up to now and are unsatisfactory as a whole. A preset corrugated deformation of the film for formation of an "interlocking action" at least in partial regions of the support surface causes stop effects which, upon removal from the stack, impair too much the pulling of the packaging container off to the side. Moreover, a possibly present inwardly positioned metallic barrier layer is easily damaged by means of a complete deformation of the film.

Other attempts in securing the position of filled packaging containers in the stack in that a spray-on adhesive is applied entail high expenditure and significant costs, impair the handling, and can be detrimental to the appearance of the packaging container due to adsorption of dust and other foreign materials.

In contrast thereto, the packaging container according to the invention comprises a film which, with a predetermined roughness, achieves a coefficient of friction of approximately 0.6 to 0.8, which has been found to be advantageous and with which a slide-resistant stacking position of packaging containers with filling material can be achieved in the stack. With this roughness, it is however still possible to remove the packaging container from the stack to the side, as is practiced when unloading, when restacking but also when removing from the stack. The rough surface provides also more grip than a smooth surface and can thus be better gripped and held upon handling.

In addition, the roughened surface has definitely proven to be an advantage for a pleasing appearance of the packaging. The surface is matt and is imparted with a paper-like appearance. This surface is directly printable due to the narrowly limited roughness depth.

The roughness provided for this purpose is in principle also applicable to monofilms, in particular also PE monofilms, when they are produced as cast films which, when extruded, pass through special cooling rollers after exiting from the slot dies. These cooling rollers then are not smooth as is conventional but are provided with an embossment profile which is designed for obtaining the desired roughness. The monofilm is thus embossed and cooled by an embossment roller that is engaging from above.

Figure 2:
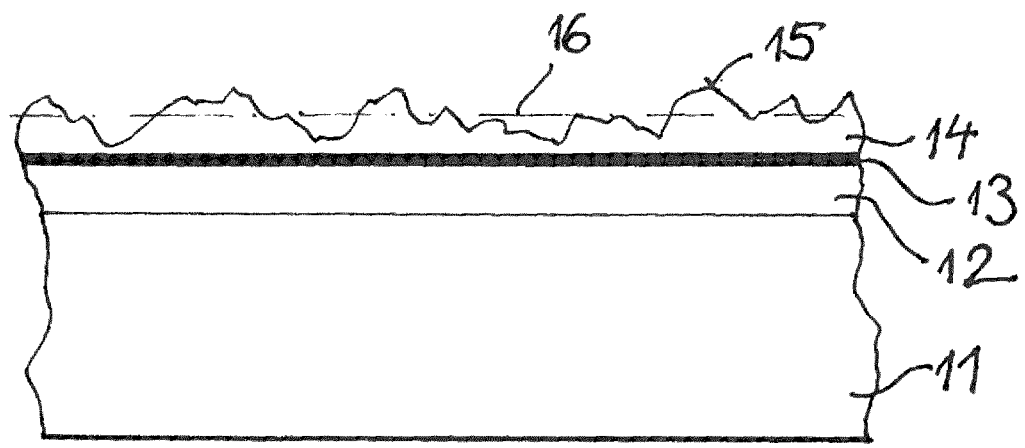
FIG. 2 enlarged-scale cross section of a film for producing a packaging container according to FIG. 1.

The cross section illustrated in FIG. 2 of a composite film with top-side embossment for obtaining the predetermined roughness is provided in a pre-processing method with a layered composite of a polyethylene layer 11 which is covered by means of an adhesive layer 12 of a thinner polyethylene melt with an aluminum foil 13. A polyethylene melt 14, for example, a cast film of the afore described kind, is applied onto this pre-manufactured layered composite and, after extrusion from a slot die, is cooled and embossed by a cooling roller with a roughness embossment. A fine irregular embossment with a roughness depth of 20-40 μm is indicated in the drawing by a contour line 15 of the surface. With such a contour, which provides in an irregular fashion a directional independence of the roughness and of the sticking friction associated therewith in any direction, the desired position securing at the surface is achieved.

The total thickness of the film is to be selected in accordance with the required load stability of the own weight of the packaging container and its loads. The polyethylene layer 11 is to be selected for practical use to be 50-200 μm, preferably 70-150 μm, and further preferred 80-120 μm. In the present example, the thickness of the layer 11 is approximately 100 μm. A bonding agent layer like the layer 12 has a thickness of only 10-50 μm, wherein mostly a thickness of 15-30 μm, preferably 20-25 μm, is to be selected. In the present case, it is selected to be 20 μm. A barrier layer 13, for example, of aluminum foil or vapor-deposited aluminum, optionally also of a vapor-deposited silicon oxide or aluminum oxide or a polyamide or polyvinyl alcohol film, can be provided to be relatively thin and has a thickness that lies regularly between 6-15 μm, mostly between 6 and 9 μm, and preferably between 6 and 7 μm. In the present case, a 7 μm thick aluminum foil is provided.

The outer layer 14 is to be embodied in particular also with respect to the roughness depth of the embossment. For a roughness depth of 20-40 μm, its thickness is to be selected generally to be between 10 and 50 μm, preferably 12-30 μm, and in particular 20-25 μm. Its layer thickness when exiting from a slot die, i.e., prior to embossment, is indicated by a dash-dotted line 16 and shows thereby an average level relative to the depressions and raised portions after embossment.

What is claimed is:

1. A packaging container for free-flowing filling material, the packaging container comprised of a packaging film, wherein the packaging film is a composite film, wherein the packaging container, when filled and closed, forms an envelope of the filling material and comprises two oppositely positioned main walls, wherein the two oppositely positioned main walls serve as support surfaces when the packaging container is stacked in a stack of filled packaging containers, wherein the composite film comprises an inwardly positioned layer of plastic material having a thickness of 70 μm to 150 μm, an outwardly positioned layer consisting of thermoplastic plastic material and having a thickness of 10 μm to 50 μm, a barrier layer and an adhesive layer arranged between the inwardly positioned layer of plastic material and the outwardly positioned layer consisting of thermoplastic plastic material, wherein the barrier layer has a thickness of 6μ to 30 μm, and wherein the adhesive layer has a thickness of 10 μm to 50 μm, wherein the composite film has a total thickness of at least 96 μm, wherein the outwardly positioned layer consisting of thermoplastic material forms an outer surface of the two oppositely positioned main walls, said outer surface comprising an embossment providing a surface roughness of a roughness depth of 20 μm-40 μm, wherein the embossment providing a surface roughness of a roughness depth of 20 μm-40 μm extends across an entire surface of said outer surface.

2. The packaging container according to claim 1, wherein the thermoplastic plastic material of said outer surface consists of a polyolefin or of a polyolefin mixture.

3. The packaging container according to claim 2, wherein the thermoplastic plastic material consists of polyethylene.

4. The packaging container according to claim 1, wherein the barrier layer is a metallic barrier layer comprised of aluminum.

5. The packaging container according to claim 4, wherein the thickness of the metallic barrier layer is 6 μm-15 μm.

6. The packaging container according to claim 1, wherein the embossment providing a surface roughness of a roughness depth of 20 μm-40 μm is embodied to be substantially direction-independent.

7. The packaging container according to claim 1, wherein the embossment providing a surface roughness of a roughness depth of 20 μm-40 μm extends continuously across the entire surface of said outer surface.

8. The packaging container according to claim 1, wherein, prior to filling, the packaging container is a packaging that is closed except for at least one fill opening.

9. The packaging container according to claim 1, wherein, prior to filling, the packing container is a hose comprising said outer surface of the two oppositely positioned main walls.

\* \* \* \* \*